United States Patent
Cao

(10) Patent No.: US 9,069,526 B2
(45) Date of Patent: Jun. 30, 2015

(54) AUDIO DATA PROCESSING METHOD AND AUDIO DATA PROCESSING SYSTEM

(75) Inventor: Hong Cao, Beijing (CN)

(73) Assignee: Vimicro Corporation, Haidian District, Beijing (CN)

( * ) Notice: Subject to any disclaimer, the term of this patent is extended or adjusted under 35 U.S.C. 154(b) by 857 days.

(21) Appl. No.: 13/337,055

(22) Filed: Dec. 24, 2011

(65) Prior Publication Data

US 2012/0116752 A1    May 10, 2012

(51) Int. Cl.
*G06F 5/00* (2006.01)
*G06F 3/16* (2006.01)
*H04L 12/18* (2006.01)
*H04L 12/58* (2006.01)
*G06F 3/00* (2006.01)

(52) U.S. Cl.
CPC ............ *G06F 3/162* (2013.01); *H04L 12/1827* (2013.01); *H04L 51/04* (2013.01); *H04L 51/063* (2013.01); *H04L 51/10* (2013.01)

(58) Field of Classification Search
CPC .............. G06F 5/00; G06F 3/00; G06F 13/00
USPC ........................ 710/52, 310; 704/200; 718/1
See application file for complete search history.

(56) References Cited

U.S. PATENT DOCUMENTS

| | | | |
|---|---|---|---|
| 8,224,885 B1* | 7/2012 | Doucette et al. | 709/201 |
| 2008/0147408 A1* | 6/2008 | Da Palma et al. | 704/270.1 |
| 2009/0003576 A1* | 1/2009 | Singh et al. | 379/202.01 |
| 2010/0250257 A1* | 9/2010 | Hirose et al. | 704/278 |
| 2012/0297383 A1* | 11/2012 | Meisner et al. | 718/1 |
| 2014/0189354 A1* | 7/2014 | Zhou et al. | 713/168 |

* cited by examiner

*Primary Examiner* — Christopher Shin
(74) *Attorney, Agent, or Firm* — Zareefa B. Flener; Flener IP Law

(57) ABSTRACT

Audio data processing method and an audio data processing system are described. The audio data processing system includes an audio collect module, a processing module, a virtual play module, a virtual collect module, and a buffer memory. The virtual play module and the virtual collect module are registered in an application interface layer of a third-part software. The third-part software chooses the virtual play module and the virtual collect module. The virtual play module is configured for receiving audio data processed by the processing module and storing the processed audio data in the buffer memory. The virtual collect module is configured for collecting the processed audio data from the buffer memory and transmitting the processed audio data to the third-part software. The invention provides a universal solution suitable for any chatting tool by installing the virtual speaker and the virtual microphone.

10 Claims, 3 Drawing Sheets

AUDIO DATA PROCESSING METHOD AND AUDIO DATA PROCESSING SYSTEM

TECHNOLOGY FIELD

The invention relates to audio data processing technology, and particularly to, a method and a system for processing real-time audio data.

BACKGROUND OF TECHNOLOGY

When using currently popular chatting tools (e.g., QQ and MSN), voice that people hear is collected by a microphone during online chat communication. In order to improve interesting of chat, one person may transmit voice information processed with a particular program to another people, for example changing a male voice to a female voice, which enables another people to hear voice with special effect, thereby improving user's experience.

Technologies in related arts form processing the voice information are generally used for particular software (i.e., chat tool). There is not any universal solution suitable for all chatting tools.

SUMMARY OF THE INVENTION

The invention discloses an audio data processing method and an audio data processing system and provides a universal solution suitable for any chatting tool by installing the virtual speaker and the virtual microphone.

The invention provides an audio data processing system comprising: an audio collect module configured for collecting audio data of a user; a process module configured for processing the audio data collected by the audio collect module according to an audio processing program; a virtual play module; and a virtual collect module; wherein, the virtual play module and the virtual collect module being registered in an application interface layer of a third-part software; the virtual play module receiving the audio data processed by the processing module and storing the processed audio data in the buffer memory; the virtual collect module collecting the processed audio data from the buffer memory and transmitting the processed audio data to the third-part software.

The invention also provides an audio data processing method used in an audio data processing system. The audio data processing system comprises a virtual play module and a virtual collect module, the virtual play module and the virtual collect module being registered in an application interface layer of a third-part software. The audio data processing method comprises steps of: collecting audio data of a user; processing the audio data according to an audio processing program; receiving the processed audio data and storing the processed audio data in a buffer memory by the virtual play module; and collecting the processed audio data from the buffer memory and transmitting the processed audio data to the third-part software by the virtual collect module.

The invention also provides an audio data processing method used in an audio data processing system. The invention provides an audio data processing method and an audio data processing system by installing the virtual speaker and the virtual microphone via a port driver. The third-part software selects the virtual play module 130 and the virtual collect module 140 to exchange data without being limited to the software itself, thereby improving its universality and user's experience.

BRIEF DESCRIPTION OF THE DRAWINGS

The invention will be readily understood by the following detailed description in conjunction with the accompanying drawings, wherein like reference numerals designate like structural elements, and in which.

EMBODIMENTS

Figure 1:
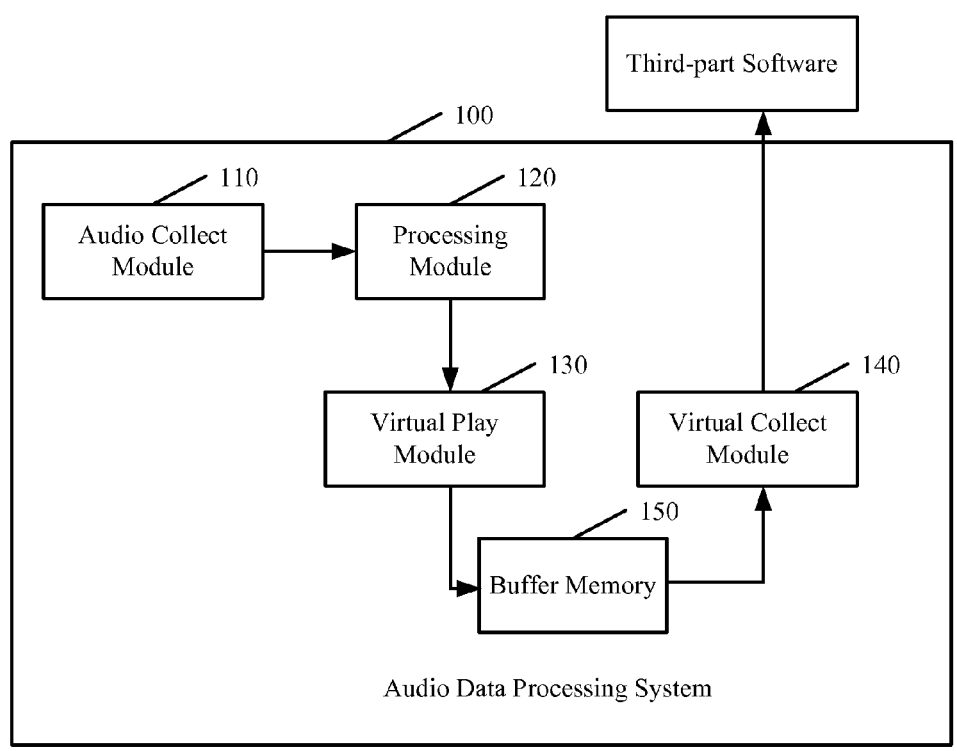
FIG. 1 is a structural diagram of an audio data processing system in a first embodiment of the invention.

FIG. 1 shows an audio data processing system 100 in a first embodiment of the invention. The audio data processing system 100 includes an audio collect module 110, a processing module 120, a virtual play module 130, a virtual collect module 140, and a buffer memory 150. The audio collect module 110 is configured for collecting audio data of a user.

The audio collect module 110 may be a microphone for instance. When a user communicates with another user by QQ or MSN chatting tools using voice chat, audio data of the users is collected by the audio collect module 110. The processing module 120 is configured for processing the audio data collected by the audio collect module 110, using an audio processing program.

In order to improve interesting of voice chat, the audio data collected by the audio collect module 110 is processed according to the audio processing program. For example, a male voice changes to a female voice, or some other voice is added to original voice of the users via the data processing. The processing of the audio data using the audio processing program has been disclosed in public, and accordingly repetitious details need not be given here for reasons of space.

The virtual play module 130 and the virtual collect module 140 are registered in an application interface layer of a third-part software, thereby enabling the third-part software to select the virtual play module 130 and the virtual collect module 140. The third-part software is an instant messaging tool, such as QQ, MSN, SKYPE, and so on.

The virtual play module 130 and the virtual collect module 140 are registered in the application interface layer of the third-part software by DirectShow.

Alternatively, the virtual play module 130 and the virtual collect module 140 may be registered in the application interface layer of the third-part software by a port driver. A work principle and a work process in a embodiment are disclosed hereunder.

When the third-part software chooses the virtual play module 130 and the virtual collect module 140, the virtual play module 130 receives audio data processed by the processing module 120 and stores the processed audio data in the buffer memory 150.

The virtual collect module 140 collects the processed audio data from the buffer memory 150 and transmits the processed audio data to the third-part software. The virtual collect module 140 may also be known as a virtual microphone. The virtual play module 130 may also be known as a virtual speaker.

The invention provides a universal audio data processing method and system thereof by using a port driver to install the virtual play module and the virtual collect module. The third-part software selects the virtual play module 130 and the virtual collect module 140 to exchange data without being limited to the software itself, thereby improving its universality and user's experience.

Figure 2:
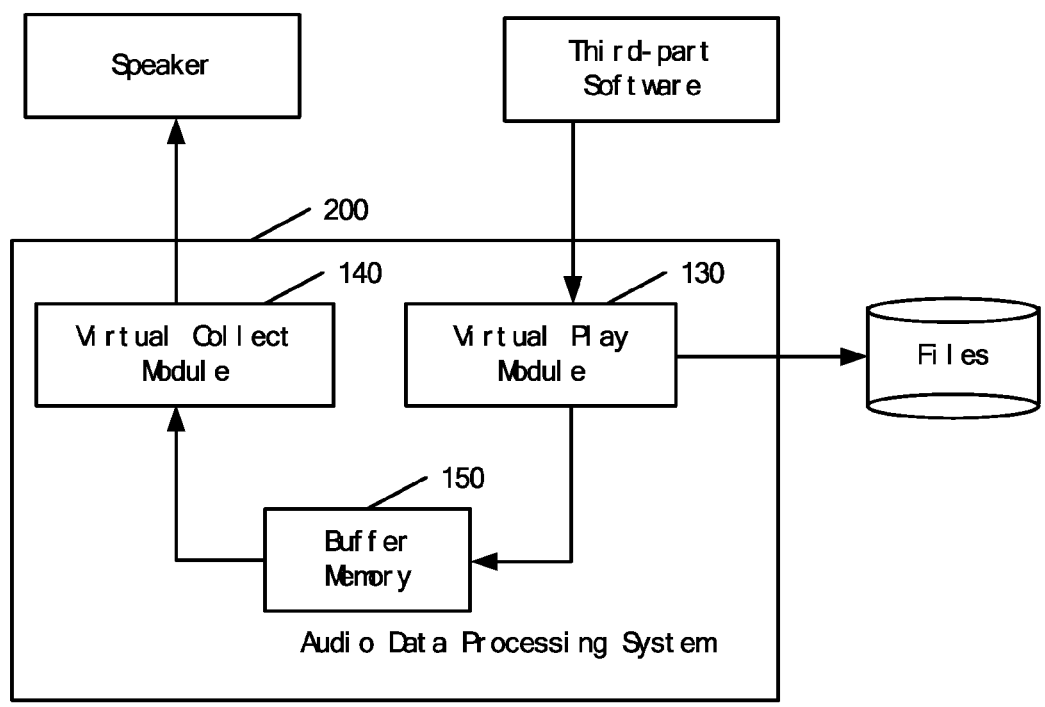
FIG. 2 is a structural diagram of an audio data processing system in a second embodiment of the invention.

FIG. 2 shows a structural diagram of an audio processing system 200 in a second embodiment. The second embodiment differs from the first embodiment in that the virtual speaker stores the audio data in a designated file and in the meantime transmits the audio data to a real speaker for playing the audio data in real time, thereby recording the audio data from other users in the designated file.

The audio processing system 200 includes an audio collect module (not shown), a processing module (not shown), a virtual play module 130, a virtual collect module 140, and a buffer memory 150.

The virtual play module 130 and the virtual collect module 140 are registered in an application interface layer of a third-part software, thereby enabling the third-part software to select the virtual play module 130 and the virtual collect module 140.

The virtual play module 130 and the virtual collect module 140 are registered in the application interface layer of the third-part software by DirectShow. Alternatively, the virtual play module 130 and the virtual collect module 140 may be registered in the application interface layer of the third-part software by a port driver.

A work principle and a work process in a embodiment are disclosed hereunder. When the third-part software chooses the virtual play module 130 and the virtual collect module 140, the virtual play module 130 receives audio data from the third-part software and stores the audio data in a designated file and the buffer memory 150.

The virtual collect module 140 collects the audio data from the buffer memory 150 and transmits the audio data to an audio playing module (speaker). The virtual collect module 140 may also be known as a virtual microphone. The virtual play module 130 may also be known as a virtual speaker. The third-part software is an instant messaging tool, such as QQ and MSN.

A main concept of the embodiments in the invention is to install a virtual speaker and a virtual microphone in an operating system. When the virtual microphone is used, a program in the application interface layer starts, processes audio data with voice change collected by the real microphone, and then transmits the processed audio data to the virtual speaker. The invention employs the virtual microphone and the virtual speaker so as to enable any chatting tool to specially process voice. The invention uses the port driver to solve the problem that the virtual microphone cannot collect the real audio data, by starting a background program.

Figure 3:
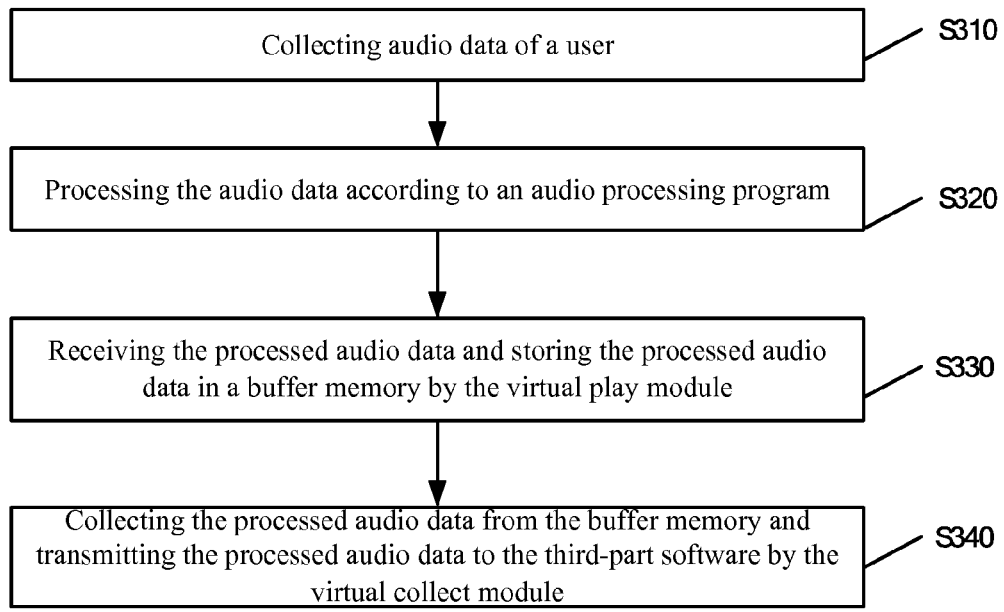
FIG. 3 is a flow chart of an audio data processing method in an embodiment of the invention.

FIG. 3 shows a flow chart of an audio data processing method in an embodiment of the invention. The audio data processing method is used in an audio data processing system. The audio data processing system has been detailed in the embodiment with reference to in FIGS. 1 and 2, and accordingly repetitious details need not be given here. The audio data processing method includes following steps.

At step S310, a user's audio data is collected. At step S320, the audio data is processed according to an audio processing program. At step 330, a virtual play module receives the processed audio data and stores the processed audio data in a buffer memory. At step 340, a virtual collect module collects the processed audio data from the buffer memory and transmits the processed audio data to a third-part software.

Figure 4:
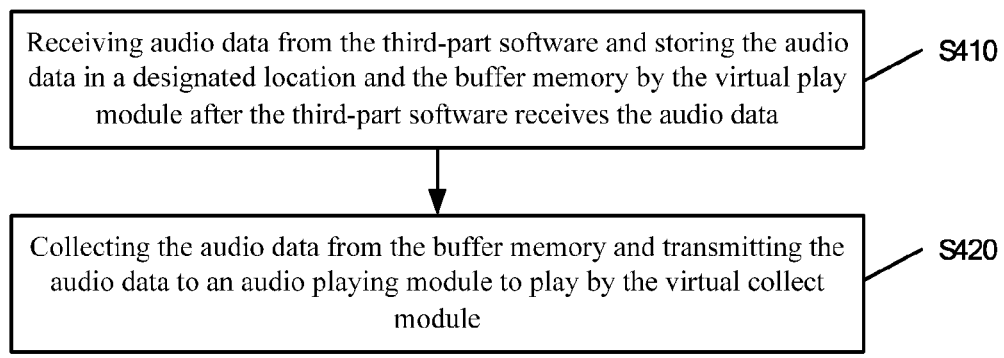
FIG. 4 is a flow chart of an audio data processing method after a third-part software receives audio data in the invention.

FIG. 4 shows a flow chart of the audio data processing method after the third-part software receives the audio data. The audio data processing method further includes following steps. At step S410, the virtual play module receives audio data from the third-part software and stores the audio data in a designated file and the buffer memory. At step S420, the virtual collect module collects the processed audio data from the buffer memory and transmits the audio data to an audio playing module.

The embodiments of the method correspond to the embodiments of the system. Those that are not detailed in the embodiments of the method may refer to the description in the embodiments of the system. It should be understandable for a person skilled in the field that all or part of the steps for carrying out the method in the above embodiments may be implemented by using a program to drive corresponding hardware. The program is stored in a readable storage medium of a computer. The program carries out the steps in the above embodiments of the method. The readable storage medium may be a magnetic disk, a compact disc, a read-only memory (ROM for short), or a random access memory (RAM for short).

It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

I claim:

1. An audio data processing system, comprising:
   an audio collect module configured for collecting audio data of a user;
   a process module configured for processing the audio data collected by the audio collect module according to an audio processing program;
   characterized in that, the audio data processing system further comprising a virtual play module and a virtual collect module;
   the virtual play module and the virtual collect module being registered in an application interface layer of a third-part software;
   the virtual play module receiving the audio data processed by the processing module and storing the processed audio data in the buffer memory; the virtual collect module collecting the processed audio data from the buffer memory and transmitting the processed audio data to the third-part software.

2. The audio data processing system as claimed in claim 1, characterized in that, the virtual play module receives audio data from the third-part software and stores the audio data in a designated file and the buffer memory; the virtual collect module collecting the audio data from the buffer memory and transmitting the audio data to an audio playing module to play.

3. The audio data processing system as claimed in claim 2, characterized in that, the virtual play module and the virtual collect module are registered in the application interface layer of the third-part software by DirectShow.

4. The audio data processing system as claimed in claim 2, characterized in that, the virtual play module and the virtual collect module are registered in the application interface layer of the third-part software by a port driver.

5. The audio data processing system as claimed in claim 4, characterized in that, the third-part software is an instant messaging tool.

6. An audio data processing method used in an audio data processing system, characterized in that, the audio data processing system comprises a virtual play module and a virtual collect module, the virtual play module and the virtual collect module being registered in an application interface layer of a third-part software; the method comprising steps of:

collecting audio data of a user;

processing the audio data according to an audio processing program;

receiving the processed audio data and storing the processed audio data in a buffer memory by the virtual play module; and collecting the processed audio data from the buffer memory and transmitting the processed audio data to the third-part software by the virtual collect module.

7. The audio data processing method as claimed in claim 6, characterized in that, further comprising:

receiving audio data from the third-part software and storing the audio data in a designated file and the buffer memory by the virtual play module after the third-part software receives the audio data;

collecting the audio data from the buffer memory and transmitting the audio data to an audio playing module to play by the virtual collect module.

8. The audio data processing method as claimed in claim 7, characterized in that, the virtual play module and the virtual collect module are registered in the application interface layer of the third-part software by DirectShow.

9. The audio data processing method as claimed in claim 7, characterized in that, the virtual play module and the virtual collect module are registered in the application interface layer of the third-part software by a port driver.

10. The audio data processing method as claimed in claim 9, characterized in that, the third-part software is an instant messaging tool.

\* \* \* \* \*